United States Patent [19]

Johnson

[11] Patent Number: 5,755,889
[45] Date of Patent: May 26, 1998

[54] SOLDER RECOVERY METHOD AND APPARATUS

[75] Inventor: Stephen Anthony Johnson, Southhampton, United Kingdom

[73] Assignee: Apple House Elecronics Ltd., Hampshire, United Kingdom

[21] Appl. No.: 556,904

[22] PCT Filed: Mar. 17, 1995

[86] PCT No.: PCT/GB95/00612

§ 371 Date: Nov. 29, 1995

§ 102(e) Date: Nov. 29, 1995

[87] PCT Pub. No.: WO95/25823

PCT Pub. Date: Sep. 28, 1995

[30] Foreign Application Priority Data

Mar. 18, 1994 [GB] United Kingdom ............... 9405418

[51] Int. Cl.⁶ .................. C22B 13/02; C22B 25/06
[52] U.S. Cl. ................ 75/414; 75/10.35; 75/690; 75/693; 75/382; 266/87; 266/227
[58] Field of Search ...................... 75/10.35, 403, 75/690, 693, 414, 382; 266/227, 87

[56] References Cited

U.S. PATENT DOCUMENTS

| | | |
|---|---|---|
| 2,278,135 | 3/1942 | Osborn ................................. 75/703 |
| 4,119,136 | 10/1978 | Gancarz, Jr. . |
| 4,334,664 | 6/1982 | Gancarz, Sr. . |
| 4,540,163 | 9/1985 | van Linden et al. . |
| 4,565,572 | 1/1986 | van Linden et al. . |
| 4,575,392 | 3/1986 | Julliard et al. ........................ 75/672 |
| 4,772,320 | 9/1988 | van Linden et al. . |

FOREIGN PATENT DOCUMENTS

| | | |
|---|---|---|
| 2312235 | 3/1973 | Germany . |
| WO 92/01895 | 6/1983 | WIPO . |
| WO 84/03719 | 9/1984 | WIPO . |

*Primary Examiner*—Melvyn Andrews
*Attorney, Agent, or Firm*—Watson Cole Stevens Davis, P.L.L.C.

[57] ABSTRACT

Apparatus and a method for recovering solder from dross. Dross is poured into a heated chamber (1). The heated dross is then compressed by a piston (21) to force good solder out of the dross into a collecting tray (17).

21 Claims, 4 Drawing Sheets

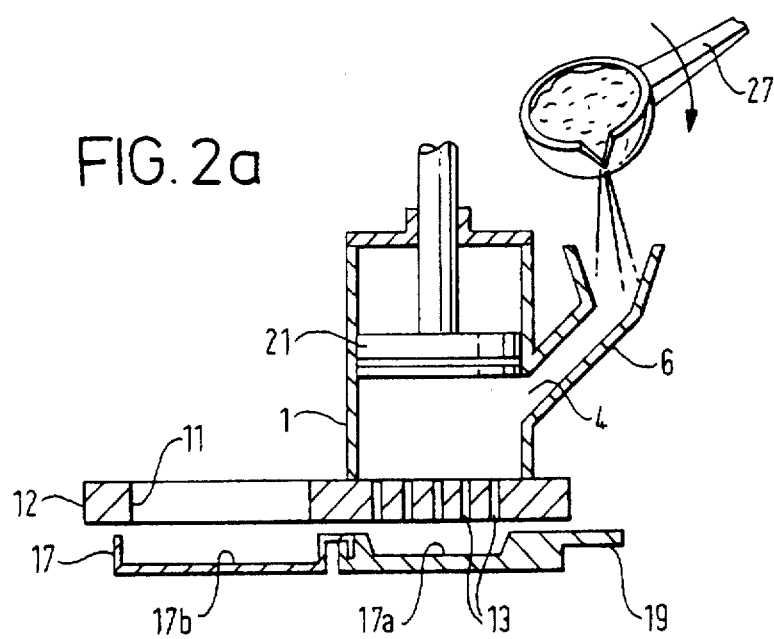
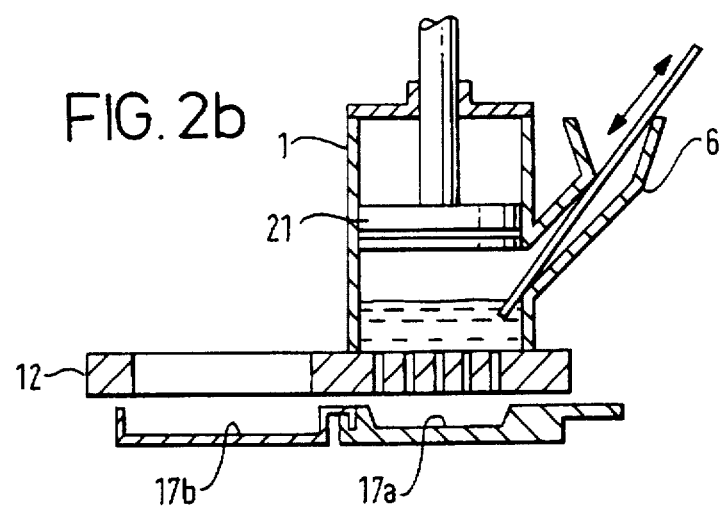
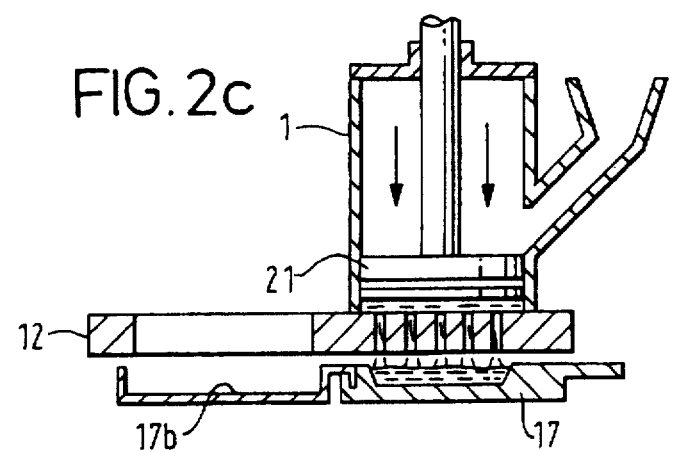

SOLDER RECOVERY METHOD AND APPARATUS

BACKGROUND OF THE INVENTION

The present invention relates to a method and apparatus for recovering solder from dross.

During soldering on an industrial scale, a heated solder bath is maintained and it is necessary to scrape off dross from the top of the solder bath at frequent intervals, the dross primarily being formed of oxides of tin and lead. However, up to 70% of the solder can be lost with the dross. Good solder can be reclaimed from the dross and conventionally this is done by simply heating the dross. However, this is a relatively inefficient method and barely economic.

SUMMARY OF THE INVENTION

According to a first aspect of the present invention, there is provided a method of recovering solder from dross, the method comprising the steps of heating and compressing the dross.

It is understood that dross consists of pockets of good solder which are surrounded by a crust-like envelope of tin and lead oxides. In the present invention, when the dross is heated and compressed, the oxide crust bursts and liquid solder can escape. In addition, any free solder in the dross removed from the solder bath will also be recovered. It is expected that at least 60% and probably more than 75% of the solder in the dross will be recovered.

The dross may be heated first and subsequently compressed.

The dross is preferably heated to a temperature of at least substantially 225° C. The dross may be heated to a temperature of substantially 350° C. Higher temperatures may be used.

The dross may be compressed with a pressure of at least substantially 0.5 kg/cm$^2$. The pressure may be substantially 5 kg/cm$^2$. Other pressures of say 1 kg/cm$^2$ to 7.5 kg/m$^2$ may be used.

According to a second aspect of the present invention, there is provided apparatus for recovering solder from dross, the apparatus comprising:

a chamber for receiving dross;

a heater for heating dross in the chamber;

compression means for compressing the dross; and, an outlet from the chamber through which recovered solder can pass.

The compression means may include a piston movable in the chamber to bear down on dross in the chamber.

A drain tray may be positioned at the outlet.

The drain tray may be provided with a plurality of apertures and may be positioned below the outlet to allow recovered solder to pass through the outlet through the drain tray apertures to a collection point. Means may be provided for reciprocatingly moving the drain tray sideways.

The heater may consist of an electric heater around the chamber.

Means may be provided for monitoring the temperature inside the chamber.

BRIEF DESCRIPTION OF THE DRAWINGS

An example of the present invention will be described with reference to the accompanying drawings, in which:

FIGS. 2a–2f are schematic diagrams showing the steps involved in the method of the present invention; and, FIG. 3 is a partially sectioned elevation of a second example of apparatus according to and for carrying out the present invention.

DESCRIPTION OF THE INVENTION

Figure 1:
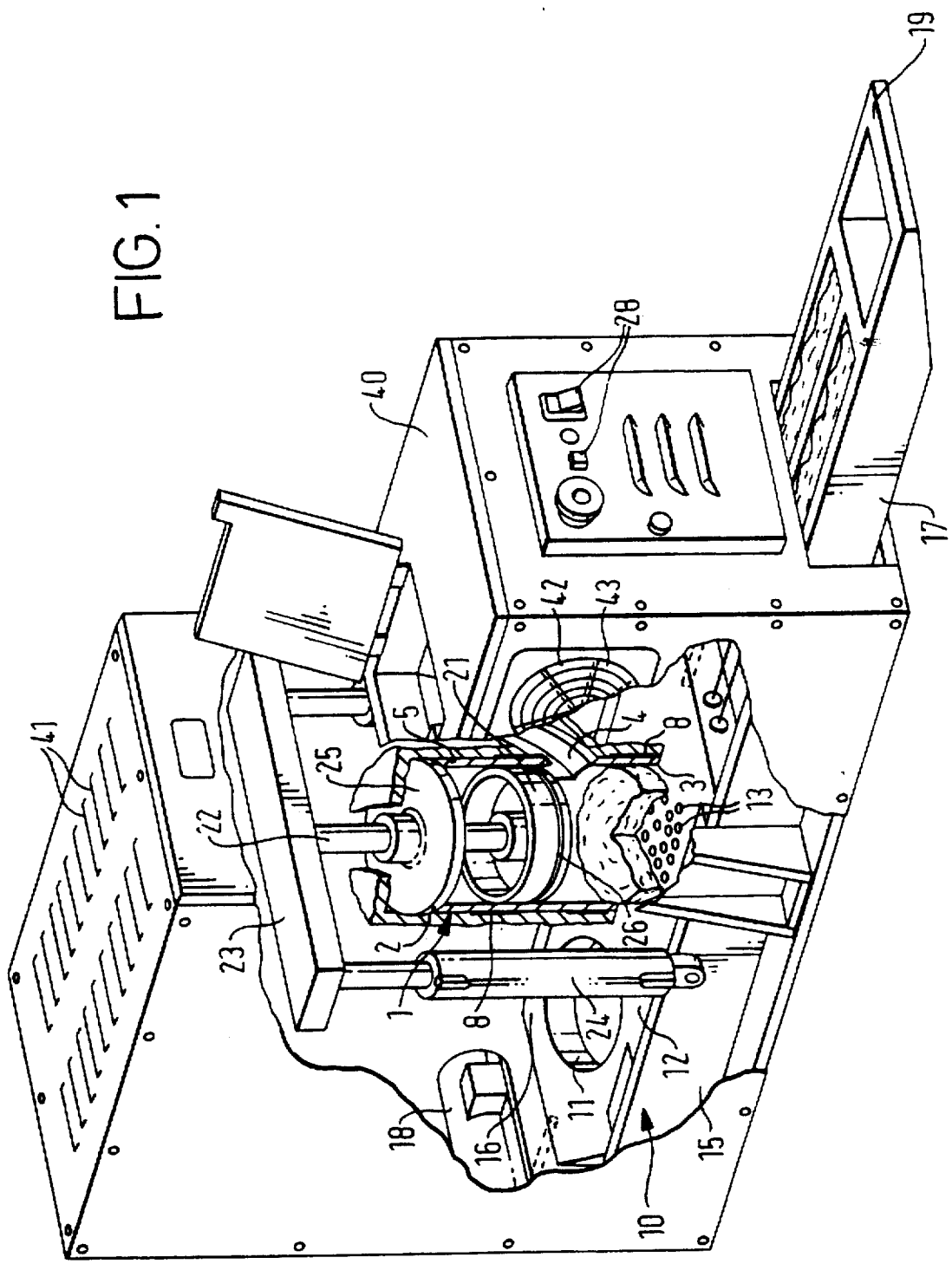
FIG. 1 is a perspective view of a first example of apparatus according to and for carrying out the present invention.

The first example of apparatus shown in FIGS. 1 and 2 has a hollow cylindrical chamber 1. The chamber 1 is vertically disposed and is open at the top end 2 and at the bottom end 3. An inlet 4 is provided in the side wall 5 of the chamber 1. A chute or hopper 6 is fixed to the side wall 5 of the chamber 1 at the inlet 4 so that dross can be fed through the hopper 6 into the interior of the chamber 1. Electric heating elements (not shown) may be provided at the base of the hopper 6. A plurality of electric heating elements 8 encircle the chamber 1.

The chamber 1 is mounted is fixed to a generally rectangular frame 10. A cast iron drain tray or grille 12 is positioned below the supporting bottom plate 9 and can slide back and forth below the chamber 1 in grooves provided in opposed side walls 15, 16 of the frame 10. The grille 12 has an array of apertures 13 drilled in one end and also has a through-hole 11 at the other end, the through-hole 11 having a size corresponding to the size of cross-sectional size of the chamber 1. The grille 12 is also provided with electric heating elements (not shown).

A collection tray 17 is also mounted in the frame 10 for reciprocable movement. The tray 17 is divided into two adjacent compartments 17a,17b, which may each be of a size and shape corresponding to the open bottom end 3 of the chamber 1. Sliding movement of the tray 17 and grille 12 back and forth can be achieved by an electric motor 18 connected to the tray 17 by a chain drive. The tray 17 can also be moved manually independently of the grille 12 by means of a handle 19.

A smelting piston 21 of size corresponding to the interior cross-section of the chamber 1 is fixed for vertical movement within the chamber 1. The smelting piston 21 is supported via a piston rod 22 by a cross bar 23 above the chamber 1. The cross bar 23 is fixed to further pistons (not shown) which can move vertically up and down within respective cylinders 24 under the action of compressed air in order to lower and raise the smelting piston 21. The piston rod 22 of the smelting piston 21 passes through a top support plate 25 fixed to the top end 2 of the chamber 1 and the piston 21 has a piston ring 26.

Figure 2D:
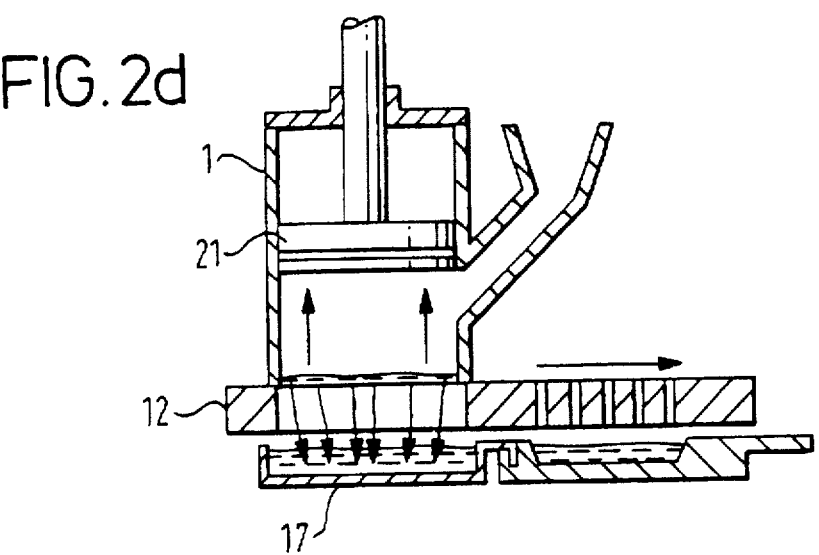

With reference to FIGS. 2a–f, in operation, the smelting piston 21 is raised to be above the level of the dross inlet 4. The chamber 1, the hopper 6 and the grille 12 are heated by use of the respective electric heaters 8,7. Dross is then poured from a ladle 27 through the hopper 6 and dross inlet 4 into the interior of the chamber 1 as shown in FIG. 2a, the heating of the grille 12 preventing any free solder from solidifying on the grille 12 which would otherwise block the apertures 13. Dross within the chamber 1 is heated by use of the chamber electric heaters 8. Preferably, the dross is heated to a temperature of at least 225° C. and, most preferably, to a temperature of substantially 350° C. The temperature of the dross may be continuously monitored by a temperature sensor (not shown).

Once the dross has approached or reached the required temperature, the smelting piston 21 is lowered in the chamber 1 to apply pressure to the heated dross as shown in FIG. 2b. The force driving the smelting piston 21 downwards should be sufficient to apply a pressure of preferably at least 0.5 kg/cm$^2$ and most preferably about 5 kg/cm$^2$. As described in the introduction above, the application of high pressure is understood to burst the oxide envelopes within the dross, allowing the solder contained within the dross and other solder removed by the process (which is molten at the high temperature reached within the chamber 1) to escape. The crusty oxides are less dense than the liquid solder and thus the liquid solder tends to pass downwards in the chamber 1 and out through the apertures 13 in the grille 12. Also, the oxides tend to form a solid but porous "cake", and thus solder can filter through the cake to the grille 12. The grille 12 tends to inhibit oxides passing through the bottom end 3 of the chamber 1. Reclaimed liquid solder therefore passes into the first compartment 17a of the tray 17 as shown in FIG. 2c.

Figure 2E:
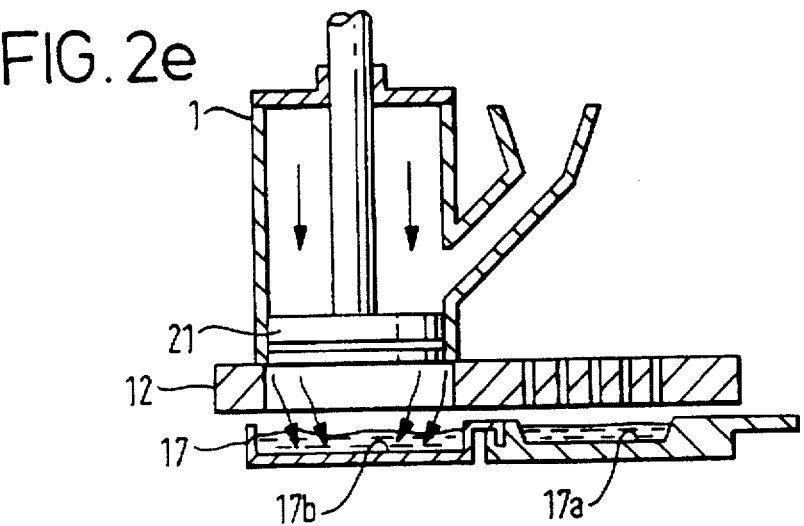
Figure 2F:
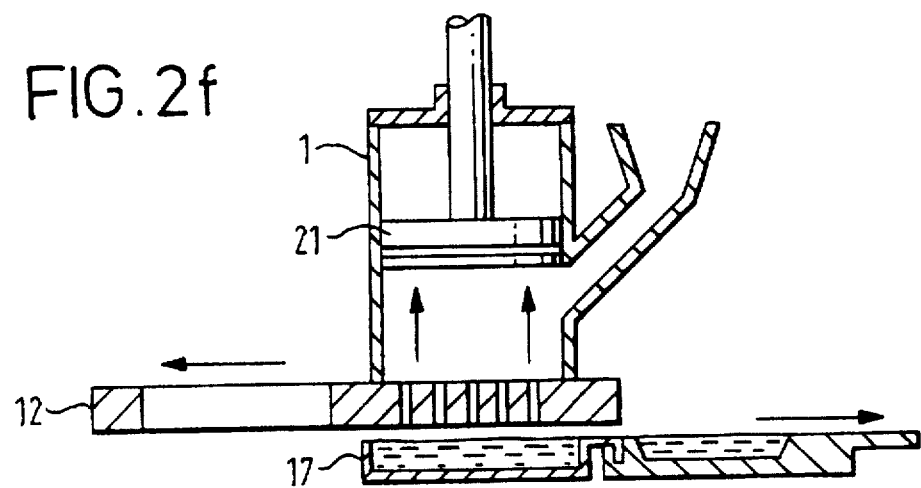

After a predetermined time of say 5 minutes, or perhaps after a predetermined amount of movement of the smelting piston 21 downwards, it can be assumed that the vast majority or substantially all of the good solder has been recovered from the dross within the chamber 1. At that time, therefore, the piston 21 is moved upwards. The tray 17 and grille 12 can be moved forwards to position the second compartment underneath the open bottom end 3 of the chamber 1 as shown in FIG. 2d. The piston 21 is then moved down within the chamber 1 again to push the remaining oxides through the open bottom end 3 of the chamber 1. The second compartment 17b can then receive oxides remaining in the chamber 1. After a further predetermined amount of time of say 10 to 30 seconds, or after a further predetermined movement of the piston 21, the oxides will have been cleared from the chamber 1 and therefore the smelting piston 21 can be fully raised again as shown in FIG. 2e. The tray 17 can be removed altogether as indicated in FIG. 2f so that the good solder in the first compartment 17a can be recovered and the second compartment 17b cleaned of oxides. The tray 17 can then be placed with the first compartment 17a underneath the chamber 1 and the process repeated.

From time to time, it will be necessary to clean the grille 12, particularly if the apertures 13 become clogged. The grille 12 can be slid out from underneath the chamber 1 for this purpose.

The whole process can be automated, perhaps under processor or sequenced logic control. An operator would therefore simply pour dross into the chamber 1 via the hopper 6 and begin the recovery sequence by operation of microswitches 28 on the hopper lid. Control of the temperature of the dross in the chamber 1 can be automated so that once the temperature of say substantially 350° C. is reached, the smelting piston 21 can automatically be lowered to compress the dross for a predetermined period of time or a predetermined travel of the smelting piston 21. After such time or piston travel, the tray 17 and grille 12 may be automatically moved under processor or sequenced logic control to position the oxides compartment 17b of the tray 17 under chamber 1 and then, after a further predetermined amount of piston travel, the smelting piston 21 can be moved upwards again. The tray 17 can then be removed to reclaim the good solder and to clean out the solder compartment 17a and the oxide compartment 17b.

Figure 3:
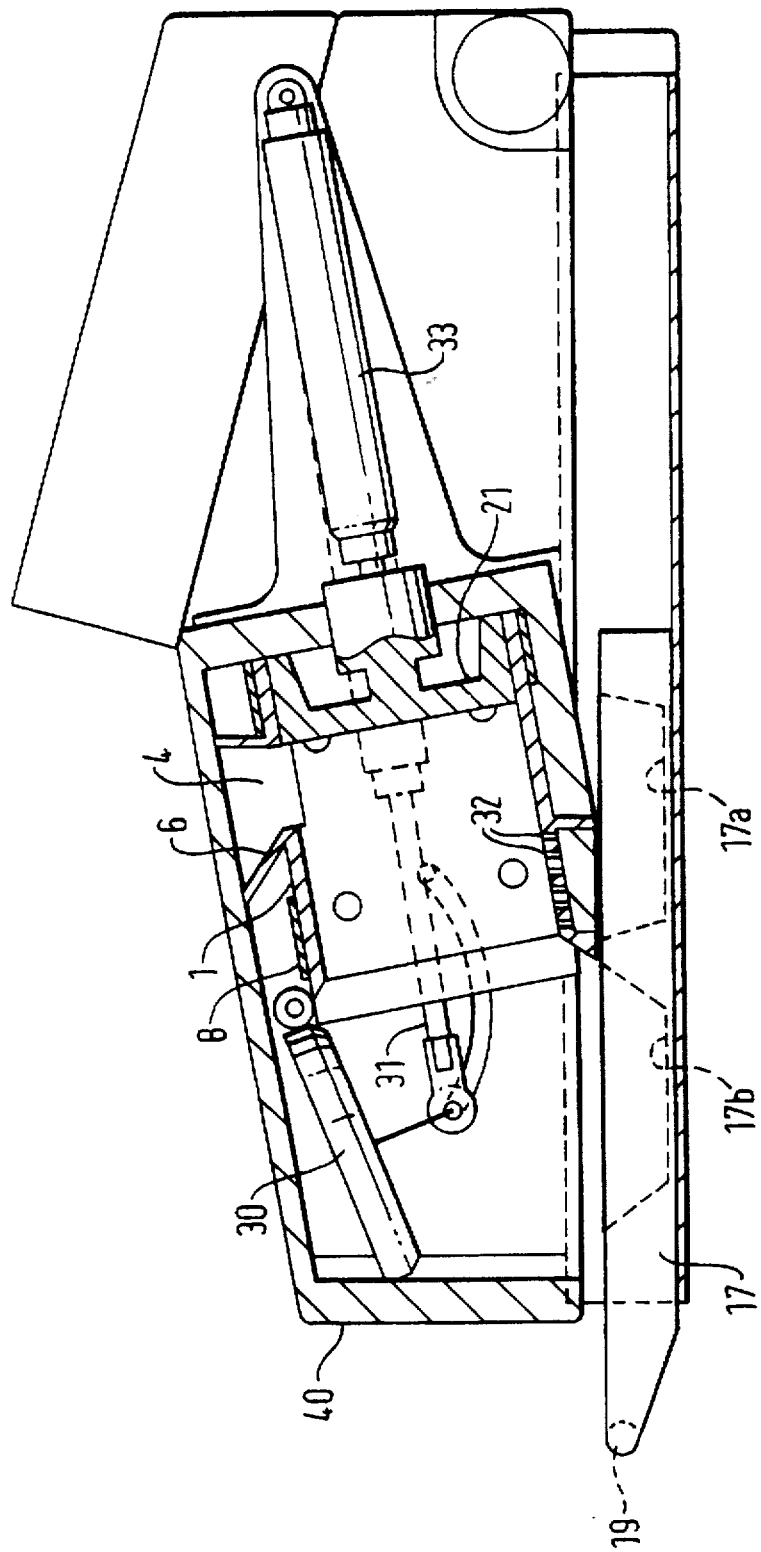

A second example of apparatus is shown in FIG. 3 in which the same reference numerals have been retained for parts corresponding to parts in the first example. In this second example, the cylindrical chamber 1 is orientated so that its longitudinal axis is at an angle of about 15° to the horizontal.

In this example, the lower end 3 of the chamber 1 is open and is closable by a hinged sealing plate 30 which is heated.

The hinged plate 30 can be drawn up to close the end 3 of the chamber 1 by pistons 31 fixed on each side of the chamber 1 and plate 30. There is no grille plate like the grille plate 12 of the first example described above. Instead, the lowermost side wall of the chamber 1 has drilled-though apertures 32. The hinged plate 30 may also have drilled apertures at its lowermost edge so that solder can be collected through the end of the chamber 1 into the solder compartment 17a of the collecting tray 17 if the solder compartment extends beyond the end of the chamber 1.

In use, the hinged seal plate 30 is closed by its pistons 31 to seal the chamber 1. The chamber 1 is heated to the preferred temperature of 350° C. Dross is loaded into the headed chamber 1 through the inlet 4. The smelting piston 21 is then pushed down the chamber by a drive piston 33 and good solder is forced through the apertures 32 in the lowermost side wall of the chamber 1 into the solder compartment 17a of the tray 17. The apparatus may be left in this condition for say 5 minutes to allow all of the good solder to drain through.

The smelting piston 21 is then withdrawn slightly and the seal plate 30 opened by the side pistons 31. The smelting piston 21 is then forced down the chamber 1 again to force the remaining oxides out of the chamber 1 into the oxides compartment 17b positioned below the open end of the chamber 1. The tray 17 can then be removed manually by use of the handle 19 to recover the solder.

The process can again be automated by processor or sequenced logic control.

In each of the examples described above, the chamber 1 and other components can be contained in a housing 40. As shown in FIG. 1 as an example, the top of the housing 40 may have vents 41 or a chimney (not shown) and an extraction fan (not shown). A filter may be provided under the vents to remove particulates or other matter prior to venting of gases produced during operation of the apparatus. The vents 41 or chimney can be connected to a factory air ducting system for expulsion outside the immediate environment of the apparatus. In FIG. 1, there is also shown a side vent 42 with an associated fan 43 to allow air to be drawn in to cool the electronic components of the apparatus.

I claim:

1. A method of recovering solder from solder dross comprising the steps of:

loading the solder dross into a chamber;

heating the solder dross in the chamber to a temperature of at least substantially 225° C.;

compressing the solder dross in the chamber; and collecting solder from the heated and compressed dross.

2. A method according to claim 1, wherein the dross is heated first and subsequently compressed.

3. A method according to claim 1, wherein the dross is heated to a temperature of substantially 350° C.

4. A method according to claim 1, wherein the dross is compressed with a pressure of at least substantially 0.5 kg/cm$^2$.

5. A method according to claim 4, wherein said pressure is substantially 5 kg/cm$^2$.

6. Apparatus for recovering solder from solder dross comprising:

a cylindrical chamber for receiving solder dross;

a heater for heating solder dross in the chamber;

a piston movable in the chamber to bear down on dross in the chamber to compress the dross; and an apertured outlet from the chamber, the apertured outlet having a plurality of apertures through which recovered solder can pass and which prevent passage of dross therethrough.

7. Apparatus according to claim 6, including a drain tray positioned at the outlet.

8. Apparatus according to claim 7, wherein said plurality of apertures are provided in the drain tray; the drain tray being positioned to allow recovered solder to pass through the drain tray apertures to a collection point.

9. Apparatus according to claim 7, including means for reciprocatingly moving the drain tray.

10. Apparatus according to claim 6, wherein the chamber has a sidewall and said plurality of apertures are provided in the sidewall of said chamber, the chamber being orientated with said drain apertures located in a lowermost portion thereof.

11. Apparatus according to claim 10, wherein said chamber has an end, and further includes a plate for sealingly closing said end.

12. Apparatus according to claim 11, further including heating means for heating the plate.

13. Apparatus according to claim 6, wherein the heater is an electric heater around the chamber.

14. Apparatus according to claim 6, including means for monitoring the temperature inside the chamber.

15. Apparatus according to claim 6, further comprising a collection tray for collecting recovered solder.

16. Apparatus according to claim 8, including means for reciprocatingly moving the drain tray.

17. Apparatus according to claim 15, wherein the collection tray has a first compartment for receiving recovered solder and a second compartment for receiving dross.

18. Apparatus according to claim 17, including means for moving the collection tray to selectively position one of the first compartment and the second compartment under the outlet.

19. Apparatus according to claim 11, further comprising a collection tray for collecting recovered solder, the collection tray including a first compartment positioned to receive recovered solder passing through said apertures and a second compartment for receiving dross passing through said end of the chamber.

20. Apparatus according to claim 11, wherein the plate is hingedly mounted to the chamber.

21. Apparatus for recovering solder from solder dross, comprising:

a cylindrical chamber for receiving solder dross;

a heater for heating solder dross in the chamber;

a piston movable in the chamber to bear down on dross in the chamber to compress the dross;

the chamber being formed with an apertured outlet having a plurality of apertures through which recovered solder can pass and which prevent passage of dross therethrough; and a collection tray positioned at the outlet, said collection tray including a first compartment for receiving recovered solder and a second compartment for receiving dross.

* * * * *